UNITED STATES PATENT OFFICE.

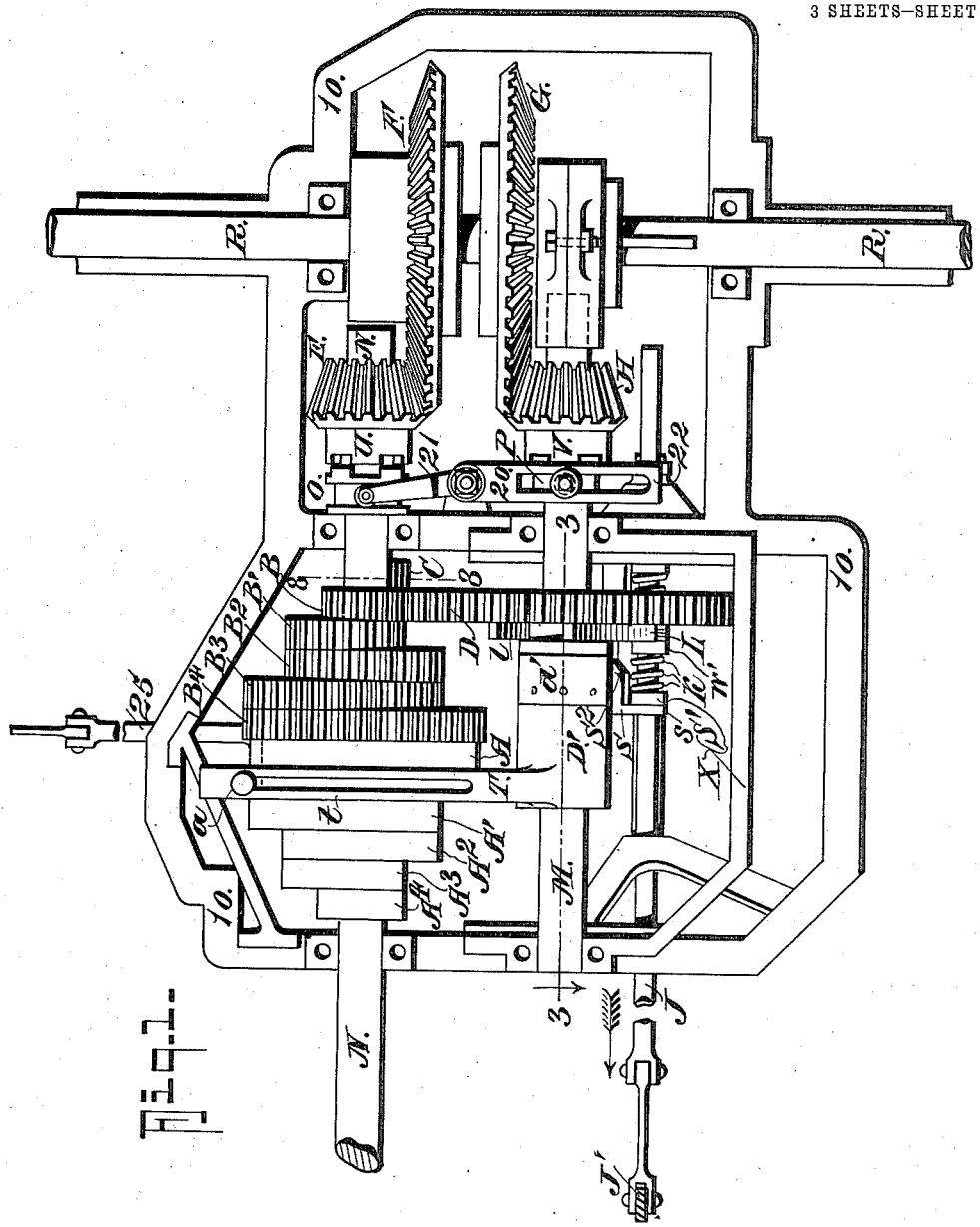

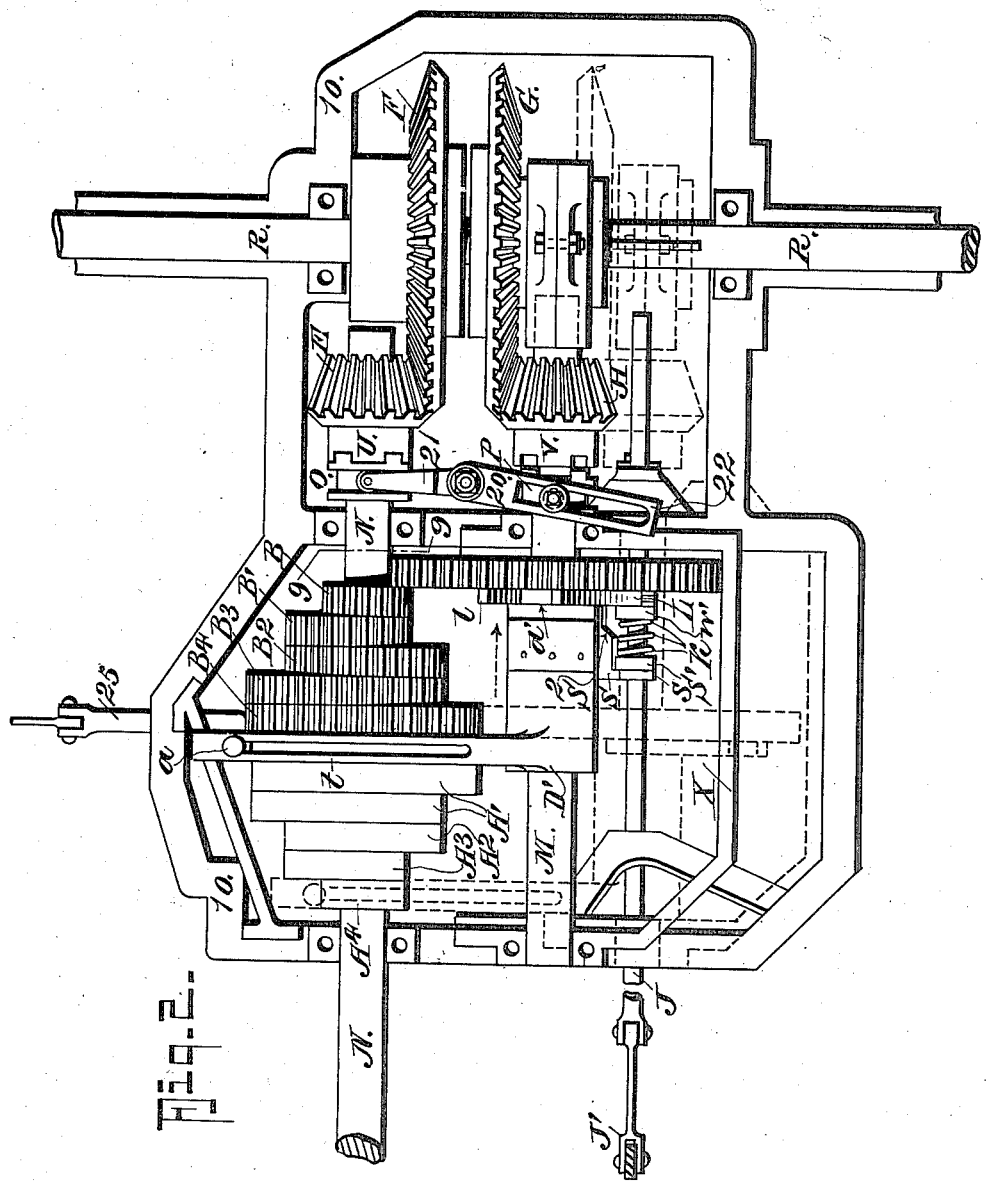

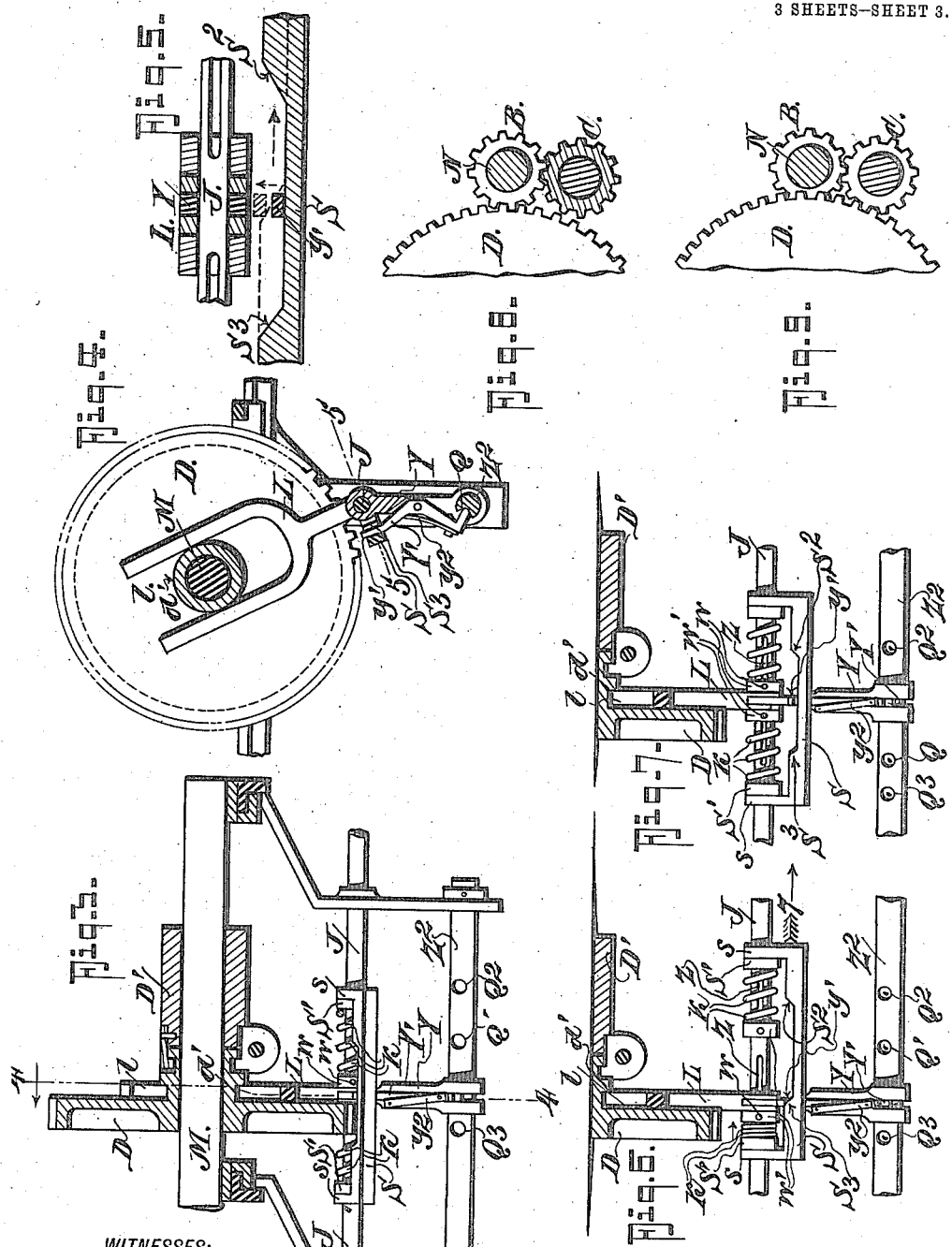

HARRY BEAUREGARD ROSS, OF DENVER, COLORADO, ASSIGNOR OF ONE-HALF TO H. BYRD NORTHROP, OF DENVER, COLORADO.

VARIABLE-SPEED TRANSMISSION-GEARING.

1,028,078.  Specification of Letters Patent.  Patented May 28, 1912.

Application filed May 12, 1911. Serial No. 626,823.

*To all whom it may concern:*

Be it known that I, HARRY BEAUREGARD Ross, a citizen of the United States, residing at Denver, in the county of Denver and State of Colorado, have invented a new and Improved Variable-Speed Transmission-Gearing, of which the following is a specification.

My present invention, which relates generally to mechanism for transmitting motion, especially designed and intended for use on auto vehicles, specifically has reference to that type of transmission mechanism disclosed in my Patent No. 989,427, dated April 11, 1911.

In my patent referred to, I have generically disclosed a changeable speed gearing, in which is included a shiftable driven gear, a directly acting lever mechanism for setting the said shiftable gear and a combination of concentric and eccentric driving gears with which the shiftable gear is cooperatively connected by a proper manipulation of the lever mechanism.

In my said patented transmission gearing, the shiftable gear, during the operation of shifting from one speed to another speed is manually adjusted or set for engaging the eccentric member of the "next" speed gear and is again manually shifted for engaging with the concentric or driving member of the said next speed gearing when said eccentric member has brought the said shiftable gear in the predetermined position for being shifted to engage the concentric gear member before mentioned.

My present invention, in its generic nature, differentiates, so far as the changeable speed gearing and the shiftable gear devices are concerned, in the means for setting the shiftable gear, which means, in the present case, embodies a balanced force or pressure against the opposite sides of the shiftable gear, a lever controlled means for increasing the said force on either side of the said shiftable gear, other means for restraining the action of the said surplus or augmented force until a predetermined time, and a further means for releasing the said restraining means to permit the said surplus force to move the shiftable gear to the desired change of speed position and for restoring the balance of the said force on opposite sides of the shiftable gear whereby to hold the said gear to its shifted position.

My present invention also comprehends certain improvements in the mounting of the eccentric members of the changeable speed gearing, the mounting of the shiftable gear and the means for directly coupling the main or driven shaft with the driven or vehicle propelling shaft, and the countershaft with the driven or propelling shaft.

In its more subordinate features my present invention comprises certain details of construction, and peculiar arrangement of parts, all of which will be hereinafter fully explained, specifically pointed out in the appended claims, and illustrated in the accompanying drawings, in which:

Figure 1, is a plan view of my present invention, the parts being shown as set to the first or low speed position. Fig. 2, is a similar view, the parts being shown at the high speed or direct driving position in dotted lines, and in its "out of mesh" position in full lines. Fig. 3, is a longitudinal section on lines 3—3 on Fig. 1, taken in the direction of the arrow. Fig. 4, is a cross section on lines 4—4 on Fig. 3, in the direction of the arrow. Fig. 5, is a cross section on the line 5—5 on Fig. 4, in the direction of the arrow. Figs. 6 and 7, are diagrammatic sections showing the operation of the gear shifting mechanism. Figs. 8 and 9, are detail sections on the lines 8—8 and 9—9 on Figs. 1 and 2, respectively.

My present invention embodies, as it were, a four speed, constant mesh sliding gear transmission mechanism, since the sliding gear is always in mesh with the changeable gearing under a direct or indirect coupling of the driven or vehicle propelling shaft and the driving or main shaft.

Referring now to the drawings, N designates the engine or driving shaft, one end of which carries a sliding clutch O, for engaging with a clutch member U on a pinion E that meshes with the gear F, fixedly mounted on the propelling shaft or axle R, suitably mounted on the framing 10, as clearly shown in Figs. 1 and 2.

20 designates a clutch shifting lever that carries a crank arm 21 that engages and shifts the clutch O, and which has a second and slotted arm 22 for engaging a sliding clutch P on the counter shaft M, parallel with the main or driving shaft N and which carries a loose pinion H that is always in mesh with a gear G keyed upon the shaft R and having a sliding movement thereon as will be presently more fully explained.

The clutch lever 20 is so arranged that under one movement it throws the clutch member O into the clutch member U and releases the clutch member P from the clutch member V, and under a reverse movement it shifts the clutch member P to close with clutch member V and simultaneously disengages the clutch members O and U, it being understood that when the clutch members O and U are joined the parts are in position for transmitting a high speed direct motion to the shaft R, through the gears E and F and when the clutch members P and V are joined the motion is indirect and through the changeable gearing the shifting gear, the countershaft M and the gears H and G.

In my present construction the changeable gearing is mounted on the main or engine shaft and the said mechanism includes a set of eccentric and concentric gears and a set of eccentric and concentric disks that coöperate and form, as it were, an integral part of the master gear $B^4$, the arrangement of which and the eccentric and concentric gears and disks is identical to the like parts disclosed in my former patent referred to, and will not therefore be specifically described further than to note that $B$—$B^2$—$B^4$ designate the first, second and third speed concentric gears, $B'$—$B^3$ the eccentric gears that coöperate with the said gears, $B$, $B^2$, $B^4$.

$A$, $A^2$, $A^4$ designate the concentric collars or disks and $A'$, $A^3$, the eccentric collars or disks that coact with the gears $B$—$B^2$ and $B^3$, and the master or third speed gear $B^4$.

D designates the shifting gear and it is held to turn with and is laterally slidable on the shaft M and the manner in which it coöperates with the speed changing gears is best explained as follows: When clutch members P and V are engaged and power is transmitted to the shaft N, assuming now the parts are positioned as is shown in Fig. 1, the power is transmitted from the shaft N, by the gears B—$B^2$, $B^4$, to the shaft M through the gear D, the said shaft M now driving the shaft R through the gears G and H; while the gears E and F run idle. Gear D changes the speed by sliding from the low speed gear B onto the eccentric gear B' with which it is held in mesh for a half revolution during which time the speed is gradually increased until gear D is slid (by the means presently described) onto the gear $B^2$ which occurs when the greatest radius point of the eccentric B' comes into alinement with the gear rim of the concentric gear $B^2$, thus bringing the parts to the second speed adjustment, it being obvious that when gear D goes through the next eccentric gear $B^3$ and slides into gear $B^4$, the speed is increased up to the third speed, see Fig. 2.

In my present invention, an automatically operating means is provided for bodily shifting frame X on which the shaft M is mounted, and it should be here stated that when the shaft M with its attached parts is shifted to and from the shaft N, the gears H and G, also slide in the longitudinal plane of the propelling shaft or axle R.

The automatically operating means mentioned includes an arm T that is rockably mounted on the shaft M and is coupled to the hub D' on one side of the gear D and the said arm has a longitudinal slot $t$ in which is adjustably mounted a cross pin or finger $a$ for extending over and engaging the position changing disks that form the mates for the changeable speed gears on the other side of the master gear $B^4$, it being understood that when the gear D is shifted laterally in either direction the arm T is likewise moved to engage with the several eccentric and concentric disks in such manner that the gear D is always held up and in mesh with the different speed changing gears.

As before stated, in my present invention the gear D is shifted at predetermined times by a stored-up force which, when released, automatically slides the gear from one of the eccentric speed changing gear into the next concentric speed increasing gear.

Referring now more particularly to Figs. 3 to 7, J designates a longitudinally shiftable rod that is suitably mounted in the main framing or gear casing, and in a plane parallel with the shafts M and N, one end of which joins with a lever J' for manually imparting the desired longitudinal movement to the rod, which movement, it should be understood, does not disturb the position of the gear D, its function being to store up an excess force or power at either side of the gear D, which is utilized when released for shifting the gear D.

L designates a lever mounted on the rod J and held to slide thereon in either direction by the studs $w$—$w$ that pass through collars $w'$ at each side of the lever L and that pass through a longitudinal slot Z in the rod J. The forked end 1 of the lever L straddles an annular groove $d'$ in the hub of gear D, such arrangement providing for moving the gear D and the arm T laterally as the lever arm L is likewise moved on the rod J.

S designates a yoke mounted upon the rod J and held to straddle the hinged end of the lever L, its ends $s$—$s$ being fixedly connected to the rod J and provided with collars $S'$—$S'$ between which and the collars $W'$, $W'$ and upon the rod J are mounted coiled springs K—K.

Referring to Figs. 6 and 7, it will be noticed that the studs W in the collars W' operate in the longitudinal slots Z in the rod J, the said operation being best explained as follows:—Slots Z are of such length as to allow one collar W' to operate at a time. Now assuming the mechanism to be with the spring compressed, as shown in Fig. 6, then the collar W' on the right side of the member L will remain in the position in which it is shown in Fig. 7, since the slot Z therefor terminates thereat for the stud W' on the rod.

The hinged end of lever L is bifurcated and in the bifurcation of the lever is fulcrumed on the rod J an arm Y, the rear end of which slides upon a cross rod $Z^2$ parallel with the rod J and which has a plurality of sockets Q, Q', $Q^2$, three being shown, one of which, Q, is in longitudinal alinement with the lever L when the latter is at a normal or midway position and one at each side of the said socket Q.

Y' designates a latch or detent that is pivotally mounted on the arm Y, its hook end being positioned to engage with any one of the sockets Q, Q', $Q^2$, a spring $y^2$ serving to force it down against the rod $z^2$.

The yoke member S has cam portions $S^2$—$S^3$ for engaging with the heel end $y'$ of the latch to lift its hook end out of the sockets in the rod $Z^2$.

When the parts are at the initial or low speed position and the lever arm L is at a central position, the lever is locked by the latch Y', which then engages the central socket W' and the pressure of the springs K—K against the opposite sides of the lever arm L is equalized, it being clear by referring to Fig. 1 that the arm L now positively holds the gear D to the low speed or normal position. Now to shift from the low to the next speed the lever rod J is manually pulled in the direction of the arrow 7 on Fig. 1, which compresses the spring K at that side and thereby stores up or increases the force against that side of the arm L and correspondingly against the gear D. This extra force is maintained until the cam $S^3$ engages the latch and trips it, and since the tension of the opposite spring K has been decreased from the normal, it follows that the increased force of the controlled spring K will now slide the arm L and with the gear D until the said gear moves into mesh with the eccentric gear B', it being temporarily held from further forward lateral movement by engaging the adjacent face of the concentric speed gear $B^2$ until the gear D comes into alinement with the teeth of the said gear $B^2$ when the said surplus force further shifts gear D in mesh with gear $B^2$, which exhausts the said surplus or accumulated force, and leaves the pressure of springs K K at the opposite sides of the gear D balanced, for holding the gear to its second speed position.

To bring the gear D to the third speed the same lever movement before explained is made, and the now increased force of the spring K before compressed, as soon as the trip latch is released, first moves the gear D through the eccentric gear $B^3$ and then into mesh with the gear $B^4$, it being clear from the drawings that to run down from third to low speed, the lever movement is in the direction of the dotted arrow, and the accumulated force is stored up by compressing the other spring K.

By reason of the arrangement and construction of the parts referred to, springs K are first compressed and then released, which moves the gear D in a direction parallel to the driving shaft from one concentric gear to another, the said gear D remaining in mesh with the eccentric gears only during the period of changing speed.

When the gear D is held completely out of mesh with the gears B, B', $B^2$, $B^3$ and $B^4$, that is, when it is in its extreme position at the right, see Fig. 2, it takes the position in line with a supplemental gear C, and when in this position, by means of a lever 25, attached to the frame, the gear D and shaft M are pulled toward the shaft N to bring the gear D into mesh with gear C. Since the said gear is a wide face gear and in mesh with the gear B the movements of the shafts M and R are reversed with respect to the motion imparted to them when the gear D is in mesh with the gear series B, B', $B^2$, $B^3$ and $B^4$.

What I claim is:—

1. In a transmission gearing; a driving shaft and a driven shaft, gear connections between the same, said connections including a shiftable gear, means for locking the said gear to its shifted position, means for first applying force to one side of the said gear to tend to shift the same and for releasing the said gear to permit the said force to act.

2. In a transmission gearing, a driving shaft and a driven shaft power transmitting connections, including a shiftable gear carrying member, between the said shafts, a spring engaging one side of the said member, a holding device for retaining the said gear carrying member in its respective positions, and a means for first putting the said spring under tension and then releasing the said holding device to permit the said spring to shift the said shiftable gear carrying member.

3. A power transmission mechanism comprising a driving shaft and a driven shaft, power transmitting connections between the said shafts, the said connections including a shiftable element, means for locking the said shiftable element in its positions, means for applying potential energy to the said shiftable element to tend to shift the same, and other means for releasing the said shiftable element locking means to permit the said element to move.

4. In a means for transmitting motion, a driving shaft, concentric gears and concentric disks thereon, eccentric gears interposed between the concentric gears, eccentric disks on the shaft interposed between the concentric disks, and in reverse order to the arrangement of the concentric and eccentric gears a sliding gear, a shaft on which said sliding gear is mounted, said sliding gear being adapted to mesh with the concentric and eccentric gears on said driving shaft, and a means for holding the said shiftable gear up and in engagement with the said driving shaft gears, said means including an arm mounted on the shiftable gear shaft and having a portion for engaging the peripheral edge of the concentric and eccentric disks, said disks having a diameter sufficient to cause said concentric and eccentric gears to mesh with said sliding gear.

5. In means for transmitting motion, the combination of a driving shaft, and a second shaft parallel to the driving shaft, a changeable speed gearing connection between the second shaft and the driving shaft, consisting of alternately arranged eccentric and concentric gears mounted on the driving shaft, with alternately arranged concentric and eccentric collar bearings arranged on the driving shaft in reverse order to the arrangement of the eccentric and concentric gears, a sliding gear on said second shaft in mesh with the concentric and eccentric gears on the driving shaft above mentioned, a yoke slidable on said second shaft and collared to the said sliding gear with which it slides in unison.

6. In a means for transmitting motion, a driving shaft, a countershaft, a changeable speed gearing connection between said counter-shaft and said driving shaft which connection consists of alternately arranged eccentric and concentric gears mounted on said driving shaft, and a sliding concentric gear mounted on and laterally slidable on said countershaft to successively engage said driving shaft gears, means separate from said countershaft for locking said shiftable gear in its shifted positions, and means for first applying a shifting force to shift said shiftable gear and subsequently unlock said shiftable gear to permit said shiftable force to act.

7. In a means for transmitting motion, the combination of a driving shaft, a driven shaft, and an interposed countershaft, a clutch and gear connection between said driving shaft and said driven shaft, a clutch and gear connection between said countershaft and said driven shaft, means for alternately connecting and disconnecting the respective clutches of said clutch and gear connections, and a changeable speed gearing connection between said driving shaft and said countershaft, said changeable speed gearing connection including a plurality of eccentric and concentric gears alternately arranged on said driving shaft, and a shiftable gear concentrically mounted on said countershaft to successively mesh with said driving shaft gears, said counter shaft being bodily movable toward and from said driving shaft and said clutch and gear connections between said counter shaft and said driven shaft being bodily movable with said counter shaft and along said driven shaft.

8. In a means for transmitting motion, the combination of a driving shaft, a driven shaft, and an interposed countershaft, a clutch and gear connection between said driving shaft and said driven shaft, a clutch and gear connection between said countershaft and said driven shaft, means for alternately operatively connecting and disconnecting the respective clutches of said clutch and gear connections, and a changeable speed gearing connection between said driving shaft and said countershaft, said changeable speed gearing connection including a plurality of eccentric and concentric gears alternately arranged on said driving shaft, and a shiftable gear concentrically mounted on said countershaft to successively mesh with said driving shaft gears, means for holding said shiftable gear in mesh with said driving shaft gears, means for locking said shiftable gear in mesh with a driving shaft gear, and other means for first unlocking said shiftable gear and then shifting it into engagement with another of said driving shaft gears, said counter shaft being bodily movable toward and from said driving shaft and said clutch and gear connections between said counter shaft and said driven shaft, being bodily movable with said counter shaft and along said driven shaft.

9. In a means for transmitting motion, the combination of a driving shaft, a driven shaft, a changeable speed gearing connection between said shafts and consisting of a number of eccentric and concentric gears alternately arranged on one of said shafts, and a concentric shiftable gear on the other of said shafts, and a reversing pinion in constant mesh with one of said first-mentioned concentric gears, and means for shifting said shiftable gear wholly out of mesh with said change speed gearing and other means for shifting said shifting gear into mesh with said reversing pinion.

10. In a transmission gearing, a drive shaft and a driven shaft, a change speed gearing between said shafts including a set of relatively fixed gears and a shiftable gear, a reversing pinion continuously in mesh with one of said relatively fixed gears, means for shifting said shiftable gear wholly out of mesh with said relatively fixed gears to permit said driven shaft to cease running, and other means for moving said shiftable gear and its shifting mechanism bodily to bring said shiftable gear into mesh with said reversing pinion.

11. In a transmission gearing, a driving shaft, a driven shaft, direct gear connections between said driving and driven shafts including a clutch device for rendering said connections operative or inoperative, a countershaft, direct gear connections between said countershaft and said driven shaft including a clutch device for rendering said last named gear connections operative or inoperative, a single clutch shifting mechanism for simultaneously shifting both clutches in opposite directions, a changeable speed gearing connecting said driving and driven shafts, and including a plurality of alternately arranged eccentric and concentric gears on one of said shafts, and a shiftable gear on the other shaft for meshing with said eccentric and concentric gears, and means for shifting said shiftable gear mechanism into mesh with different ones of said eccentric and concentric gears to change the speed of operation of said countershaft, said counter shaft being bodily movable toward and from said driving shaft and said clutch and gear connections between said counter shaft and said driven shaft being movable with said counter shaft and along said driven shaft.

12. In a transmission gearing, a driving shaft, a driven shaft, direct gear connections between said driving and driven shafts including a clutch device for rendering said connections operative or inoperative, a countershaft, direct gear connections between said countershaft and said driven shaft including a clutch device for rendering said last named gear connections operative or inoperative, a single clutch shifting mechanism for simultaneously shifting both clutches in opposite directions, a changeable speed gearing connecting said driving and driven shafts, and including a plurality of alternately arranged eccentric and concentric gears on one of said shafts, and a shiftable gear on the other shaft for meshing with said eccentric and concentric gears, means for shifting said shiftable gear mechanism into mesh with different ones of the eccentric and concentric gears to change the speed of operation of said countershaft, a reversing pinion in mesh with one of said concentric gears, said shiftable gear shifting mechanism adapted to shift said shiftable gear into alinement with said reversing pinion, but not into contact therewith, and other means for moving said shiftable gear bodily into mesh with said reversing pinion, said counter shaft being bodily movable toward and from said driving shaft and said clutch and gear connections between said counter shaft and said driven shaft being movable with said counter shaft and along said driven shaft.

13. In a power transmitting mechanism, a driving shaft and a second shaft driven therefrom, a plurality of successively arranged gears on said driving shaft, a single gear on said second shaft to mesh successively with all of said gears on said driving shaft and a mechanism for shifting said single gear in planes parallel to itself, which shifting mechanism includes a shifting arm engaging said shiftable gear, a latch for latching said arm to hold said shiftable gear immovable and a power applying and latch releasing device for first applying a gear shifting force, and upon further movement releasing said latch to permit said force to act.

14. As a gear shifting mechanism, the combination with the bodily shiftable gear, of a shifting arm engaging said gear, a latch for latching said arm in different shifted positions and a device engaging said arm and operating at the beginning of its movement to apply a shifting force to said arm and upon further movement, release said latch to permit said force to act.

HARRY BEAUREGARD ROSS.

Witnesses:
JULIUS NICOLAUS,
MABEL VEZIE.